(12) United States Patent
Wang et al.

(10) Patent No.: US 6,471,919 B2
(45) Date of Patent: Oct. 29, 2002

(54) APPARATUS FOR REMOVING IMPURITIES FROM EFFLUENT WASTE GAS STREAMS

(75) Inventors: Chung-Chih Wang, Taichung Hsien (TW); Jerry Sun, Hsinchu Hsien (TW); Wu-Chung Wen, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/861,203

(22) Filed: May 16, 2001

(65) Prior Publication Data

US 2001/0021357 A1 Sep. 13, 2001

Related U.S. Application Data

(63) Continuation of application No. 09/191,918, filed on Nov. 13, 1998, now abandoned.

(30) Foreign Application Priority Data

Nov. 15, 1997 (TW) ............................................. 86117091

(51) Int. Cl.$^7$ .......................... B01D 47/06; B01D 53/34; F01N 3/00; C10J 1/08
(52) U.S. Cl. ...................... 422/172; 422/168; 422/171; 261/115; 159/3; 159/5
(58) Field of Search ................................ 422/168, 171, 422/172, 176, 177, 181; 261/115, 108, 112.1; 159/3, 4.01, 5

(56) References Cited

U.S. PATENT DOCUMENTS

| | | | | |
|---|---|---|---|---|
| 3,698,158 A | * | 10/1972 | Kinnebrew | 96/249 |
| 4,104,041 A | * | 8/1978 | Arita et al. | 95/213 |
| 5,022,241 A | * | 6/1991 | Wilkinson | 62/271 |
| 5,316,737 A | * | 5/1994 | Skelley et al. | 422/170 |
| 5,510,087 A | * | 4/1996 | Johnson et al. | 422/173 |
| 5,759,233 A | * | 6/1998 | Schwab | 95/8 |
| 5,777,058 A | * | 7/1998 | Fischer | 528/9 |
| 5,879,432 A | * | 3/1999 | Morlec et al. | 95/114 |

* cited by examiner

Primary Examiner—Jerry D. Johnson
Assistant Examiner—Alexa A. Doroshenk
(74) Attorney, Agent, or Firm—Ladas & Parry

(57) ABSTRACT

An apparatus for removing fluorinated and chlorinated compounds contained in waste gas streams from semiconductor etch and deposition processes. The apparatus has a treatment chamber in which a plurality of liquid films are formed to absorb the fluorinated and chlorinated compounds contained in the waste gas streams that pass through the liquid films. The apparatus includes a tank for receiving the mixture of the absorbed fluorinated and chlorinated compounds and the liquid, and a dehumidifying device for stabilizing and dehumidifying the humidified waste gas streams.

31 Claims, 4 Drawing Sheets

APPARATUS FOR REMOVING IMPURITIES FROM EFFLUENT WASTE GAS STREAMS

This is a continuation of U.S. Ser. No. 09/191,918 filed on Nov. 13, 1998 now abandoned.

FIELD OF THE INVENTION

The present invention relates to an apparatus for removing impurities from effluent waste gas streams, and in particular to an apparatus for removing fluorinated and chlorinated compounds from effluent waste gas streams from semiconductor etch and deposition processes.

DESCRIPTION OF THE RELATED ART

Fluorinated and chlorinated compounds are used in semiconductor etch and deposition processes. These compounds are suspected of causing global warming and environment pollution and contamination, and should be removed.

Scrubbing apparatuses made by STMI EcoSys Corporation have been widely used by semiconductor manufacturers. Among these scrubbing apparatuses, the ES Vector Series Models (for example, the ES-100 model) uses plastic packing therein to let effluent gas streams from semiconductor etch and deposition processes contact with a liquid (for example, water) so that the impurities in the effluent gas streams can be absorbed into the water and removed. However, the plastic packing needs replacement after a period of treatment time and bubbles form in the plastic packing when the scrubbing apparatus is used. These disadvantages limit the total flow rate (indicating the efficiency of the scrubbing apparatus) of the waste gas streams through the ES-100 type scrubbing apparatus to only 2831 liters/m$^3$.

Incineration has been shown an effective means of removing the impurities in the effluent gas streams from semiconductor etch and deposition processes. The Delatech of the CDO series of the ATMI EcoSys Corporation incinerates waste gas streams at a temperature of 850° C. However, the total flow rate of the waste gas streams using the Delatch is only about 300 liters/m$^3$. And chlorine gas produced in the incineration is a flammable gas which is explosive and hazardous to both personnel and equipment because of its corrosivity and in some cases toxicity.

SUMMARY OF THE INVENTION

It is therefore an object of the invention to provide an apparatus for removing impurities from waste gas streams that can eliminate the above disadvantages of the prior art.

The above object of the invention is attained by providing a plurality of water films formed by a spraying device, each of which are formed vertically and spaced apart from each other in a treatment chamber in a manner that waste gas streams are sucked through the plurality of water films by a blower, and the impurities contained therein are mixed with water to form a mixture while simultaneously the waste gas streams are humidified. The mixture flows downward and is removed and the humidified waste gas stream is sucked out from the treatment chamber.

Most impurities, such as fluorinated and chlorinated compounds, contained in the waste gas streams are almost dissolved in water. The mixture is flowed into and stored in the tank so as to be further treated, and the amount of the mixture is detected by a set of sensors disposed in the tank. Therefore, water consumed in the semiconductor etch and deposition process can be supplied in time.

According to an aspect of the invention, each water film is formed by a spraying device disposed in the treatment chamber, which includes a pipe having a nozzle from which the water is sprayed out and a plate disposed on the opposite side of the nozzle. The sprayed-out water impinges on the plate to form the water film.

According to another aspect of the invention, the apparatus for removing impurities from waste gas stream also includes a dehumidifying device. The dehumidifying device includes a chamber having a plurality of perforated buffer plates disposed along the longitudinal axis thereof and a plurality of filtering plates disposed along the longitudinal axis thereof. The perforated buffer plates stabilize the humidified waste gas streams that pass through the plates. The filtering plates remove the solid impurities in the humidified waste gas streams and condense the humidified waste gas streams so as to dehumidify them.

BRIEF DESCRIPTION OF THE DRAWINGS

The invention can be more understood by reference to the preferred embodiment and the accompanying drawings in which.

DETAILED DESCRIPTION OF THE PREFERRED EMBODIMENT

Figure 1A:
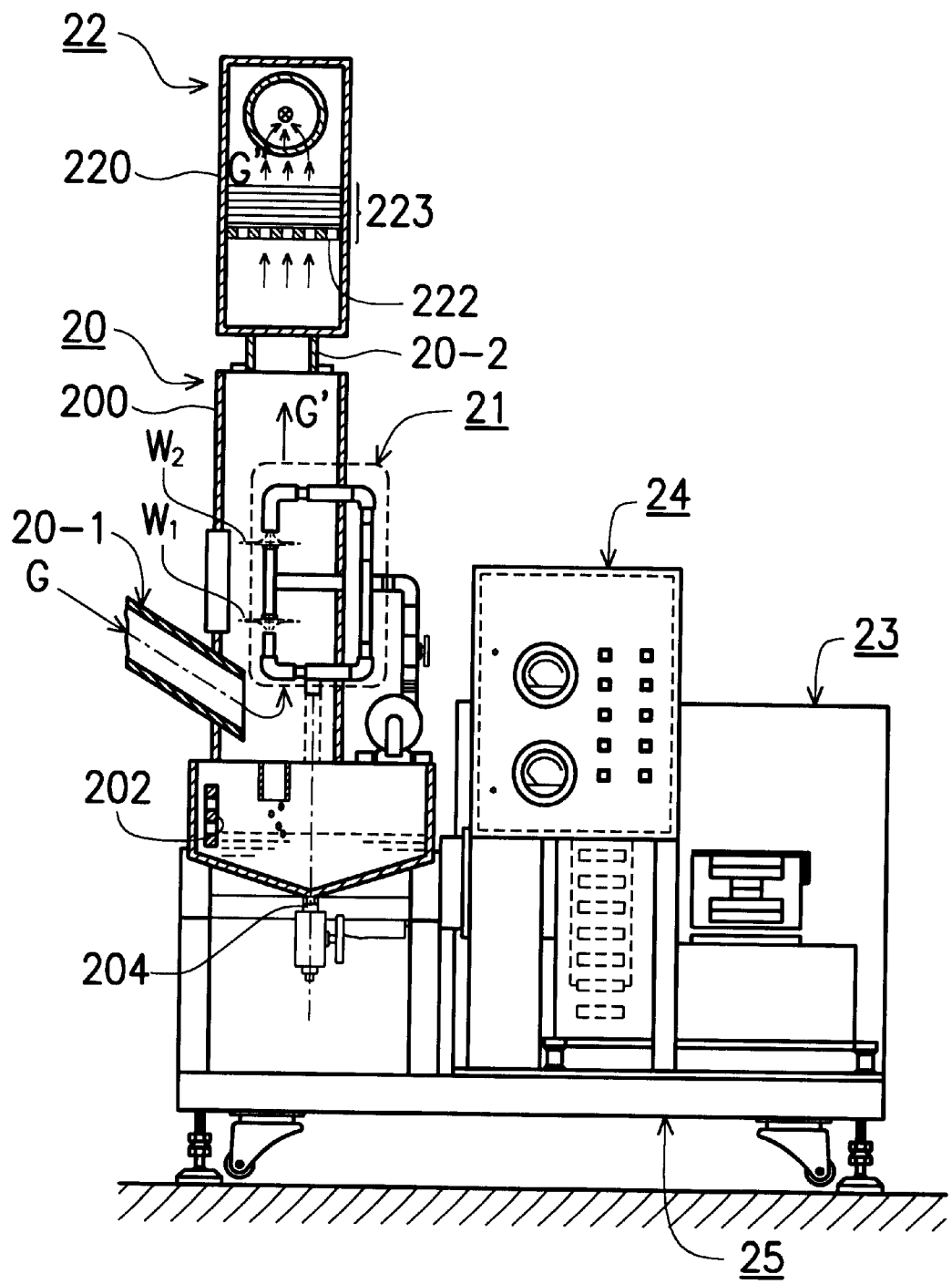
FIG. 1A is a front view of an apparatus for removing impurities from effluent waste streams of an embodiment of the invention.

Referring to FIG. 1A, the apparatus of the preferred embodiment of the invention includes a treatment chamber 20, a liquid spraying device 21, a dehumidifying device 22, a suction blower 23 and a control device 24. The treatment chamber 20, the liquid spraying device 21, the dehumidifying device 22, the suction blower 23 and the control device 24 are arranged together and supported by a supporting frame 25.

Figure 2:
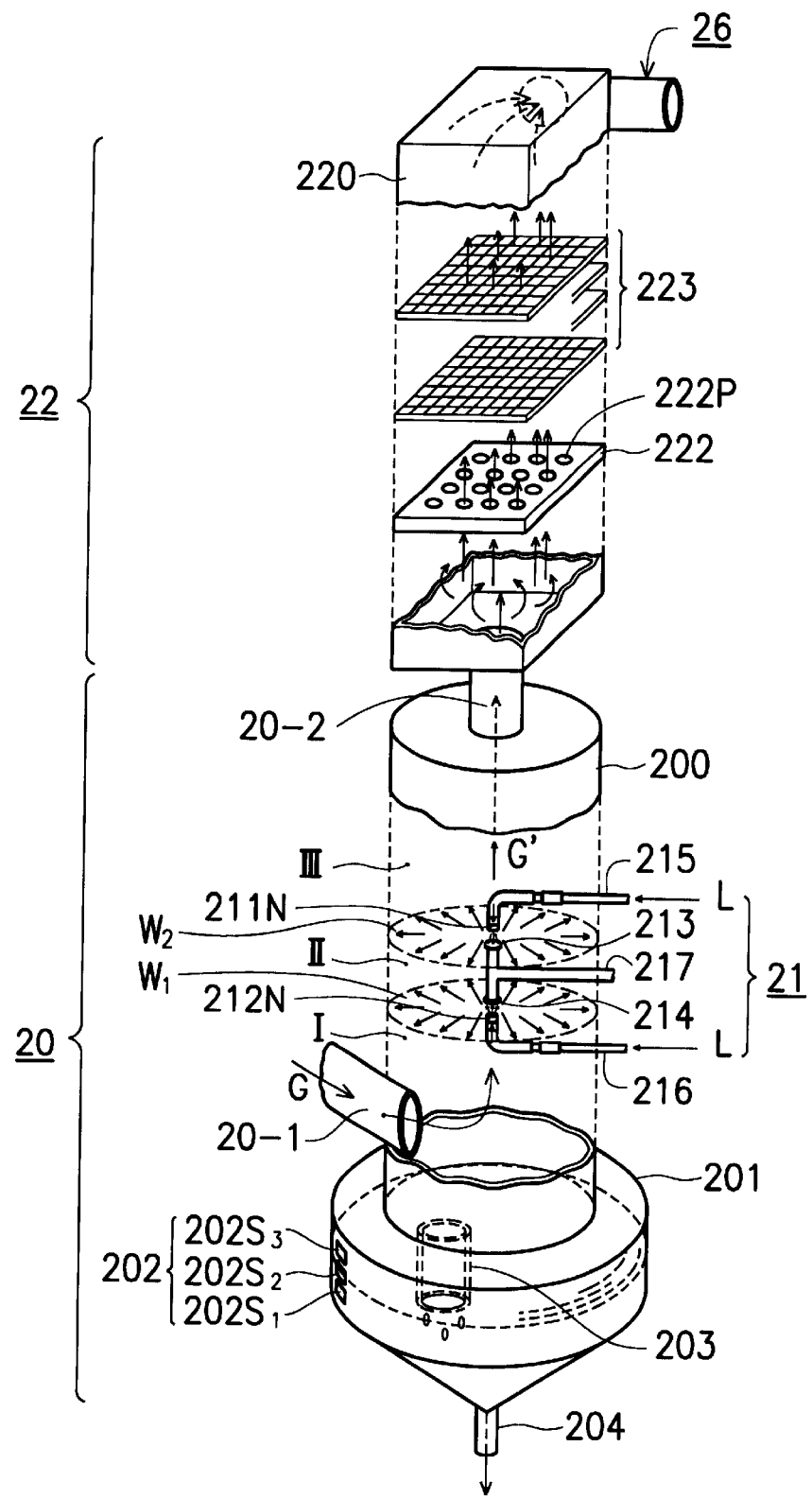
FIG. 2 is a partial exploded view showing the arrangement of the treatment chamber, the spraying device and the dehumidifying device of the apparatus for removing impurities of FIG. 1A.

Referring to FIG. 2, the treatment chamber 20 is a cylindrical chamber and includes an inlet conduit 20-1 through which the waste gas streams G containing chlorinated compounds and fluorinated compounds (hereinafter referred to as impurities) are introduced, an outlet conduit 20-2 connected to the dehumidifying device 22 and a tank 201. The tank 201 is disposed under the treatment chamber 20 and has a cone-shaped configuration. The tank 201 is communicated with the treatment chamber 20 by a conduit 203. The tank 201 is also fitted with a set of sensors 202 (sensors 202S$_1$, 202S$_2$ and 202S$_3$) disposed on the inner wall thereof so that the level of the liquid in the tank 201 can be sensed and fed back to the control device 25 so as to control the level of the liquid in the tank 201. An exhaust conduit 204 is provided at the bottom of the tank 201.

Referring gain to FIG. 2, the spraying device 21 is disposed in the treatment chamber 20. The spraying device 21 includes two pipes 215, 216. The two pipes 215, 216 respectively have nozzles 211N and 212N from which water delivered from the pipe 215 is sprayed out from the nozzle 211N in a downward direction and water delivered from the pipe 216 is sprayed out from the nozzle 212N in an upward direction. Two plates 213, 214 are disposed on the opposite sides of the nozzle 211N and the nozzle 212N, respectively. The two plates 213, 214 are mounted on the two ends of a T-shaped frame 217 which is mounted on the inner wall of the treatment chamber 20. When water is sprayed out from the nozzles 211N and 212N, it impinges on the plates 213, 214 respectively and forms a first water film $W_1$ and a second water film $W_2$, and thus the treatment chamber 20 is divided into three spaces I, II and III.

Figure 1B:
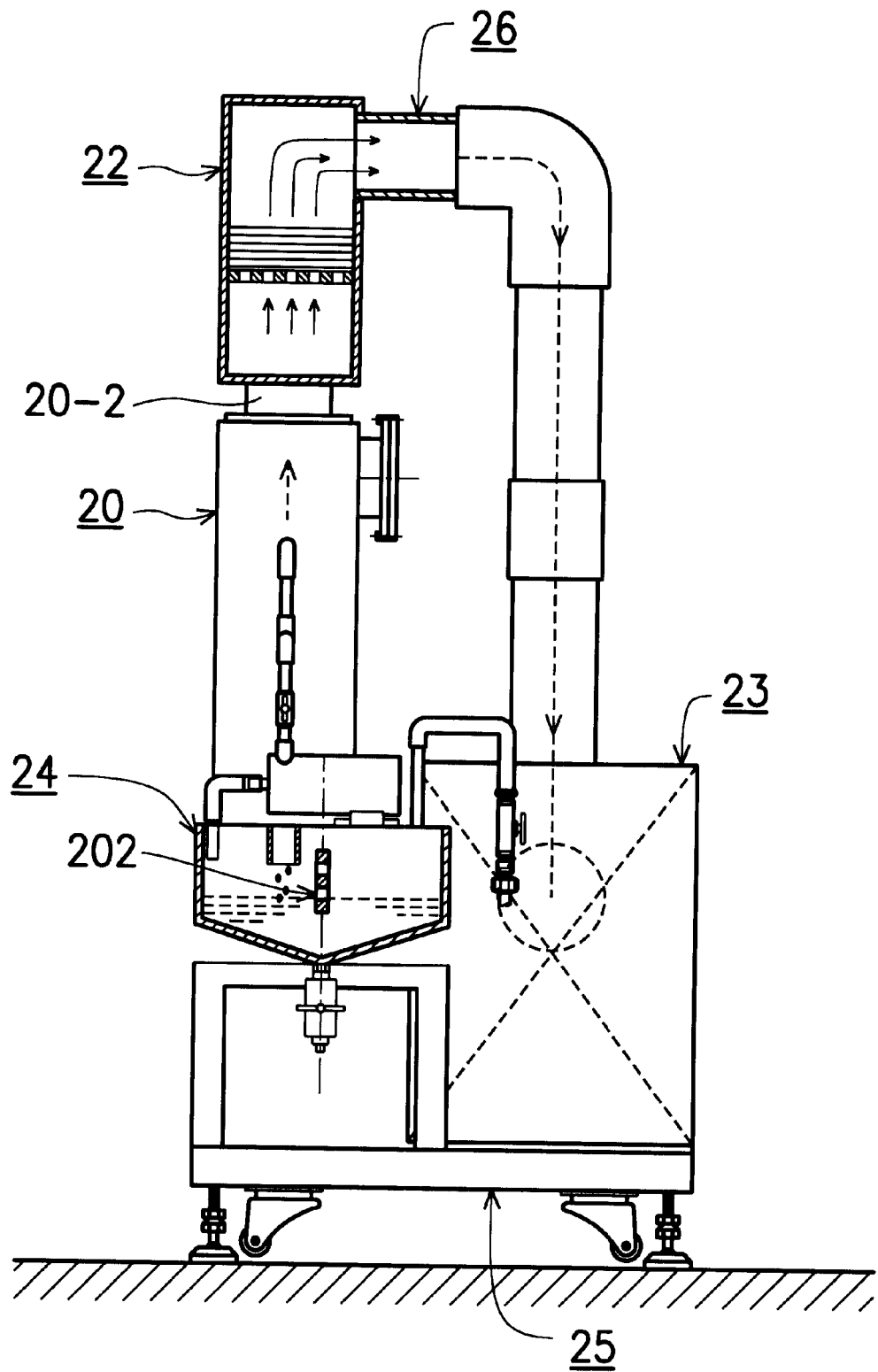
FIG. 1B is a side view of the apparatus of FIG. 1A.
Figure 1C:
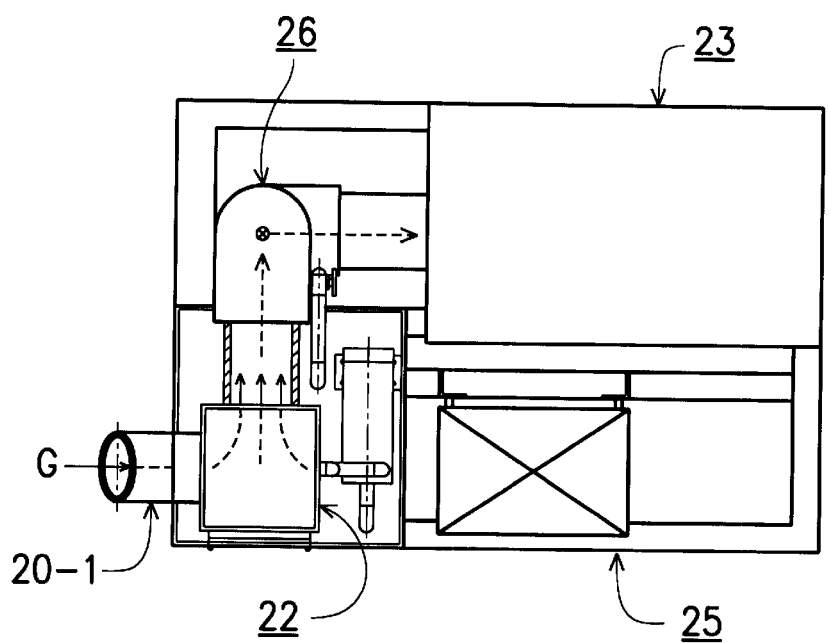
FIG. 1C is the top view of the apparatus of FIG. 1A.

Referring now to FIG. 1B and FIG. 1C, the dehumidifying device 22 is connected to the suction blower 23 by a connecting pipe 26. When the suction blower 23 is activated, the waste gas streams introduced from the inlet conduit 20-1 are sucked upward through the water films $W_1$ and $W_2$ and subsequently the dehumidifying device 22. When the waste gas streams pass through the water films $W_1$ and $W_2$, the impurities are mixed with water to form a mixture and simultaneously the waste gas streams are humidified. The mixtures are collected in the tank 200 and exhausted from the exhaust conduit 204 or recycled Referring now to FIG. 2, the dehumidifying device 22 has the function of stabilizing and dehumidifying the humidified waste gas streams G'. The dehumidifying device 22 has a housing 220 in which one perforated plate 222 and two filtering plates 223, 223 are disposed along its longitudinal axis. The two filtering plates 223, 223 are disposed downstream of the perforated plate 222 and are spaced apart each other. The holes 232p of the perforated plate 232 can stabilize the flow of the waste gas streams. The filtering plates 223 are formed by metal nets and can remove the solid impurities in the humidified waste gas streams and condense the humidified waste gas streams so as to dehumidify them. The filtering plates 223 can also eliminate the holdup of the humidified waste gas streams when they pass through the perforated plate 232 and the filtering plates 223, 223.

Referring to FIG. 1A, the control device 24 is used to control the flow rate of the waste gas streams passing through the treatment chamber 20 and the dehumidifying device 21, the flow rate of the liquid coming out from the nozzles 211N and 212N and also the level of the liquid mixture in the tank 201 by using the sensors $202S_1$, $202S_2$ and $202S_3$. The structure of the control device 20 is easily understood by those in the field, and thus the detailed description is omitted.

In the structures as described above, the fluorinated and chlorinated compounds contained in waste gas streams from semiconductor etch and deposition processes are absorbed by the water films and removed. The total flow rate of the waste gas streams in the apparatus as described above can reach 6000 liters/m³. No bubbles are formed in the treatment chamber 20 because no packing is used therein. The humidified waste gas streams exiting the treatment chamber 20, from which the impurities have been removed, are dehumidified by the dehumidifying device 220.

What is claimed is:

1. An apparatus for removing impurities from effluent waste gas streams, comprising:
   a) a treatment chamber having an inlet for introducing the effluent waste gas streams and an outlet;
   b) a spraying device for spraying liquid disposed in said treatment chamber to form a plurality of liquid films, each of which are spaced from each other;
   c) a plate having at least one solid and continuous surface whereon said liquid is sprayed; and
   d) a blower for sucking the waste gas stream upwardly through the plurality of spaced liquid films in which a portion of the impurities in the waste gas streams is mixed with the liquid to form a liquid mixture and simultaneously the waste gas stream is humidified, wherein the liquid mixture flows downward and the humidified waste gas is sucked out from the outlet of said treatment chamber.

2. The apparatus as claimed in claim 1, further comprising a tank disposed under said treatment chamber for receiving the liquid mixture.

3. The apparatus as claimed in claim 1, wherein said spraying device includes a pipe disposed in the center of said treatment chamber having a nozzle from which the liquid is sprayed out, said plate member disposed on the opposite side of said nozzle in a manner that the sprayed-out liquid impinges on said plate member to form the liquid film.

4. The apparatus as claimed in claim 3, further comprising a device for controlling the level of the liquid mixture, the flow rate of the effluent waste gas streams passing through said treatment chamber, and the flow rate of the liquid coming out from nozzles of said spraying means.

5. The apparatus as claimed in claim 1 wherein the plate members are essentially planar, horizontally disposed, disposed parallel to each other, and the liquid film formed on each plate member has a diameter bigger than that of the outlet.

6. The apparatus of claim 1, wherein the plate comprises:
   a first plate and a second plate, each of said plates being horizontally located within said chamber; and wherein the spraying device comprises:
   a) a first spraying device placed above the first plate, liquid being sprayed out from the first spraying device in a downward direction toward the first plate to form a first liquid film on the solid and continuous surface of the first plate; and
   b) a second spraying device placed below the second plate, liquid being sprayed out from the second spraying device in an upward direction toward the second plate to form a first liquid film on the solid and continuous surface of the second plate.

7. An apparatus for removing impurities from effluent waste gas streams comprising:
   a) a gas treatment chamber having an inlet for introducing the effluent waste gas streams and an outlet;
   b) a spraying device for spraying liquid disposed in said treatment chamber to form a plurality of liquid films, each of which are formed horizontally and spaced from each other, the spraying device including a pipe disposed in a central portion of said treatment chamber, said pipe having a plurality of nozzles from which liquid is sprayed out toward a plurality of plate members disposed confronting said nozzles, said plate members having at least one solid and continuous surface such that the sprayed-out liquid from said nozzles impinges to form the liquid films;
   c) a blower for sucking the waste gas stream upwardly through the liquid films in which a portion of the impurities in the waste gas streams is mixed with the liquid to form a liquid mixture and simultaneously the waste gas stream is humidified, wherein the liquid mixture flows downward and the humidified waste gas is sucked out from the outlet of said treatment chamber; and
   d) a dehumidifying device for dehumidifying the humidified waste gas streams sucked from the outlet, disposed above said treatment chamber.

8. The apparatus as claimed in claim 7, wherein said dehumidifying device comprises a chamber having a plurality of perforated buffer plates disposed along the longitudinal axis thereof, each of which is disposed therein and space apart; and a plurality of filtering members disposed along the longitudinal axis thereof, each of which is disposed therein and spaced apart.

9. The apparatus as claimed in claim 8, wherein said filtering members is disposed downstream of the perforated buffer plates.

10. The apparatus as claimed in claim 7, further comprising a tank disposed under said treatment chamber for receiving the liquid mixture.

11. The apparatus as claimed in claim 7, wherein said spraying device includes a pipe disposed in the center of said treatment chamber having a nozzle from which the liquid is sprayed out, and a plate member disposed on the opposite side of said nozzle in a manner that the sprayed-out liquid impinges on said plate member to form the liquid film.

12. The apparatus as claimed in claim 7, further comprising a device for controlling the level of the liquid mixture, the flow rate of the effluent waste gas streams passing through said treatment chamber, and the low rate of the liquid coming out from nozzles of said spraying means.

13. The apparatus as claimed in claim 7, wherein said liquid is water.

14. The device as claimed in claim 7, wherein the waste gas streams are from semiconductor etch and deposition processes.

15. The apparatus as claimed in claim 7 wherein the plate members are essentially planar, horizontally disposed, and are disposed parallel to each other, wherein the surface of each plate member is continuous and the liquid film formed on each plate member has a diameter bigger than that of the outlet.

16. An apparatus for removing impurities from an effluent gas stream, the apparatus comprising:
    a treatment chamber having an inlet and an outlet, the inlet communicating the gas stream into the chamber;
    a first plate horizontally located in the chamber and having an upper surface and a lower surface, at least one of said surfaces being solid and continuous;
    a first spraying device located within the chamber and spaced from and confronting one of the surfaces of the first plate;
    wherein liquid is sprayed through the spraying device toward the first plate to form a liquid film thereon such that the effluent gas stream passes from the inlet to the first plate and spraying device to mix with the liquid sprayed from the first spraying device toward the first plate.

17. The apparatus of claim 16 further comprising a second plate located horizontally in the chamber and having a top surface and a bottom surface, wherein at least one of the surfaces is solid and continuous, the second plate being spaced from the first plate and situated in parallel with the first plate; the first plate and the second plate being located between the inlet and the outlet; and a second spraying device located within the chamber and confronting the second plate, the second spraying device being located centrally of at least one of the surfaces of the second plate, the first spraying device being located centrally of at least one of the surfaces of the second plate; wherein liquid is sprayed through the second spraying device toward the center of the second plate and from the first spraying device toward the center of the first plate to form liquid films on each plate such that the effluent gas stream passing by the first and second plates mixes with the liquid sprayed from the first and second spraying devices toward the first and second plates.

18. The apparatus of claim 17 wherein the liquid sprays of the first and second spraying devices which are directed toward the first and second plates respectively extend to and past the surfaces of the first and second plates confronting the first and second spraying devices respectively.

19. The apparatus of claim 17 wherein the first spraying device is directed to the top surface of the first plate and the second spraying device is directed to the bottom surface of the second plate; the bottom surface of the second plate being located opposite of the top surface of the first plate.

20. The apparatus of claim 16 wherein there are a plurality of horizontally spaced plates, each plate having an upper surface and a lower surface, at least one of the surfaces being solid and continuous; and a plurality of spraying devices, each plate being associated with a different spraying device of the plurality of spraying devices, the plurality of plates being located between the inlet and the outlet and parallel to each other, each one of the plurality of spraying devices confronting a single one of the plates to spray liquid toward the center of the single confronting plate to form a film of liquid on the surface of the single confronting plate.

21. The apparatus of claim 20 wherein the plates each have a diameter which is greater in width than the width of the inlet.

22. The apparatus of claim 20 wherein the plates each have a diameter which is smaller in width than the width of the inlet.

23. The apparatus of claim 16 wherein the first spraying device is generally centrally located with respect to the first plate such that liquid sprayed from the first spraying device toward the center of the first plate travels outwardly from the center of the first plate toward the outside edges of the first plate.

24. The apparatus of claim 16 wherein the plate has a diameter which is greater in width than the width of the inlet.

25. The apparatus of claim 16 further comprising a blower connected to the outlet to suck the effluent air past the plate, spray and spraying device.

26. The apparatus of claim 16 wherein the plate has a diameter which is smaller in width than the width of the inlet.

27. An apparatus for humidifying effluent gas comprised of:
    a treatment chamber having an inlet and an outlet, the inlet communicating the gas stream into the chamber;
    a first plate horizontally located in the chamber and having an upper surface and a lower surface, wherein at least one of the surfaces is solid and continuous;
    a first spraying device located within the chamber and spaced from and confronting the solid continuous surface of the first plate, the first spraying device being centrally located with respect to the first plate;
    a second plate located horizontally in the chamber and having a top surface and a bottom surface, wherein at least one of the surfaces is solid and continuous, the second plate being horizontally spaced from the first plate, the first plate and the second plate being located between the inlet and the outlet; and
    a second spraying device located within the chamber and confronting the solid continuous surface of the second plate, the second spraying device being centrally located with respect to the second plate; wherein liquid is sprayed through the second spraying device toward the center of the second plate and from the first spraying device toward the center of the first plate to form liquid films on each plate such that the effluent gas passing by the first and second plates mixes with the liquid sprayed from the first and second spraying devices toward the first and second plates.

28. The apparatus of claim 27 wherein the plates are located in parallel with each other.

29. The apparatus of claim 27 further comprising a blower connected to the outlet for sucking the effluent gas stream past the plates and spray and toward the blower.

30. The apparatus of claim 27 wherein the first spraying device is directed to the top surface of the first plate and the second spraying device is directed to the bottom surface of the second plate; the bottom surface of the second plate being located opposite of the top surface of the first plate.

31. An apparatus for removing impurities from an effluent gas stream, the apparatus comprising:

a treatment chamber having an inlet and an outlet, the inlet communicating the gas stream into the chamber;

a plate located in the chamber and having at least one solid and continuous surface;

a spraying device located with the chamber and spaced from and confronting the solid and continuous surface of the first plate;

wherein liquid is sprayed through the spraying device toward the plate to form a liquid film thereon such that the effluent gas stream passing by the first plate mixes with the liquid sprayed from the spraying device toward the plate.

* * * * *